US008289371B2

(12) United States Patent
Wagner et al.

(10) Patent No.: US 8,289,371 B2
(45) Date of Patent: Oct. 16, 2012

(54) SMART CROPPING OF VIDEO IMAGES IN A VIDEOCONFERENCING SESSION

(75) Inventors: Niv Wagner, Rechovot (IL); Zigi Gavish, Tel Aviv (IL)

(73) Assignee: Polycom, Inc., San Jose, CA (US)

( * ) Notice: Subject to any disclaimer, the term of this patent is extended or adjusted under 35 U.S.C. 154(b) by 1547 days.

(21) Appl. No.: 11/751,558

(22) Filed: May 21, 2007

(65) Prior Publication Data

US 2008/0291265 A1 Nov. 27, 2008

(51) Int. Cl.
*H04N 7/14* (2006.01)
(52) U.S. Cl. ............. 348/14.16; 348/14.08; 348/14.09
(58) Field of Classification Search ..... 348/14.01–14.16
See application file for complete search history.

(56) References Cited

U.S. PATENT DOCUMENTS

| | | | | |
|---|---|---|---|---|
| 5,835,129 A * | 11/1998 | Kumar | ................ | 348/14.09 |
| 6,300,973 B1 | 10/2001 | Feder et al. | | |
| 7,321,384 B1 * | 1/2008 | Wu et al. | ................ | 348/14.08 |
| 7,542,068 B2 | 6/2009 | Eshkoli et al. | | |
| 2002/0188731 A1 | 12/2002 | Potekhin et al. | | |
| 2002/0191861 A1 * | 12/2002 | Cheatle | .................. | 382/282 |
| 2006/0072811 A1 * | 4/2006 | Porter et al. | ............ | 382/159 |
| 2006/0139371 A1 * | 6/2006 | Lavine et al. | ............. | 345/620 |
| 2006/0192847 A1 * | 8/2006 | Watanabe | .............. | 348/14.07 |
| 2006/0215753 A1 * | 9/2006 | Lee et al. | ............ | 375/240.08 |

FOREIGN PATENT DOCUMENTS

WO 0215556 A2 2/2002

* cited by examiner

*Primary Examiner* — Melur Ramakrishnaiah
(74) *Attorney, Agent, or Firm* — Wong, Cabello, Lutsch, Rutherford & Brucculeri, L.L.P.

(57) ABSTRACT

Systems and methods are disclosed for controlling cropping areas of video images to match the allocated area associated with the image in a video conferencing layout. The disclosed methods can protect regions of interest from being cropped. A region of interest within a video image is identified to adjust the cropping in such a way that the region of interest is preserved within the cropped image. The region of interest may be identified based on motion detection or flesh tone detection, for example.

19 Claims, 6 Drawing Sheets

SMART CROPPING OF VIDEO IMAGES IN A VIDEOCONFERENCING SESSION

FIELD OF THE INVENTION

The subject matter of the present disclosure relates to the field of communication and more specifically to the field of videoconferencing. More specifically, methods and systems for cropping a video image to fit within a video conferencing layout are disclosed.

BACKGROUND

A common video communication session can be managed by a multipoint control unit (MCU). To present a video image within an allocated area over a screen of a receiving endpoint, the video image can be cropped by the MCU. An MCU can crop lines or columns from one or more edges of a conferee's image. Occasionally regions of interest of the image are close to a cropped edge and may be cropped. Accordingly, there is a need in the art for cropping methods that will keep the region of interest within the displayed image. The region of an interest is a sub-image that reflects information relevant to the conference such as an image of a conferee, for example.

An endpoint is a terminal on a network, capable of providing real-time, two-way audio/visual/data communication with other terminals or a MCU. An endpoint may provide speech only; speech and video; or speech, data and video communications, etc. Exemplary endpoints include Polycom VSX series, HDX series, etc. (Polycom, Inc.). An MCU is a conference controlling entity located in a node of the network or in a terminal, which receives and processes several media channels from access ports according to certain criteria and distributes them to the connected channels. Examples of MCUs include the MGC-100, RMX 2000 (Polycom Inc.). Some MCUs can be composed from two logical units: a media controller (MC) and a media processor (MP). A more thorough definition of an endpoint (terminal) and an MCU can be found in the International Telecommunication Union ("ITU") standards, such as but not limited to the H.320, H.324, and H.323 standards. Additional information regarding the ITU standards can be found at the ITU website www.itu.int.

SUMMARY

A system and method are disclosed for controlling cropping areas of one or more conferees' video images to match the allocated area associated with the image. The disclosed methods prevent regions of interest from being cropped. Different methods can be used to define the region of interest of an image. Some methods are automatic other are semi-automatic methods that prompt a user to adjust his camera. Other methods use a combination of automatic and semi-automatic such as an automatic decision for defining the cropped area and semi-automatic involvement to verify the automatic decision and match the camera setting to the cropped image, if needed.

The MCU may use the far end camera control (FECC) signals to set the camera of the relevant endpoint. By using the FECC signals the camera of the relevant endpoint is set to centralize the regions of interest (ROI).

An exemplary automatic decision algorithm can use motion criteria to define a region of interest of a video image. Such an embodiment may utilize a motion detector for defining the region of interest. The motion detector algorithm may implement filters for reducing the affects of uninteresting (interference) types of movements such as the movement of fans, clock, etc. Some of the filters may use low pass filters for removing fans, for example. Other filters can be notch filters to remove the movement of hands of a clock, digit of a clock display, etc. Other embodiments may use band-pass filter. The band-pass filter can match the frequency range of common movements of a conferee.

Other exemplary decision algorithm may analyze the hue of areas of the video image, looking for flesh tone colors to define regions in which a conferee is displayed. Such an embodiment may include a bank of flesh tones colors according to the different races.

Other exemplary embodiments using semiautomatic methods may inform a conferee whose image will be cropped and request him to adjust his camera such that regions of interest are away from the edges of the image. In one exemplary embodiment an MCU may send an impression of the size of the cropped image. The endpoint can be adapted to crop the 'self view image'/PIP (picture in picture) according to the required size of the cropped image. The required size can be defined by the number of pixels in each axis (X;Y) of the cropped image. The endpoint can crop the 'self view image'/PIP in the same proportion of (X;Y) and displaying the cropped self image to the conferee. The conferee can be prompt to set the camera to place the region of interest away from the edges. Prompting the conferee can be done by adding a text data to the video that is sent to the conferee's endpoint or by using voice message. In one embodiment, the endpoint can be capable of cropping its video image according to the required size and the cropped image can be sent to the MCU. In other embodiment, the endpoint can send the entire image, which was taken after setting the camera, and the MCU can crop it.

Alternatively the endpoint can be adapted to create an outline over its 'self view image'/PIP, which is displayed to the conferee. The outline can reflect the MCU cropped image. The conferee can set his camera verifying that the region of interest is within the outline borders.

Alternatively the MCU can be adapted to add a cropped video image of a conferee to the composite video of a CP image that is targeted to the conferee whose image was cropped. The cropped self image can be accompanied with a banner (text or IVR, interactive voice response) prompting the conferee to set his camera accordingly. The cropped self image can be placed on the CP image in a manner that alerts the cropped conferee. For example, the cropped self image can be blinked or have a colored outline, etc. Such a process can run for a period of time and then the MCU may remove the cropped self image from the CP image and may create the common CP image. Alternatively a conferee may request the MCU to add and deliver its cropped self image to adjust his camera. Such a request can be sent by using a man-machine interface (MMI) discussed in more detail below. The MMI may use a click and view function or voice detection option, etc. More information on such MMI methods can be found in U.S. patent application Ser. No. 10/346,306, the content of which is incorporate herein by reference.

BRIEF DESCRIPTION OF THE DRAWINGS

Exemplary embodiments of the present invention will be more readily understood from reading the following description and by reference to the accompanying drawings, in which.

DETAILED DESCRIPTION

Turning now to the figures in which like numerals represent like elements throughout the several views, exemplary embodiments, aspects and features of the disclosed systems and methods are described. For convenience, only some elements of the same group may be labeled with numerals. The purpose of the drawings is to describe exemplary embodiments and not for production or limitation.

Figure 1:
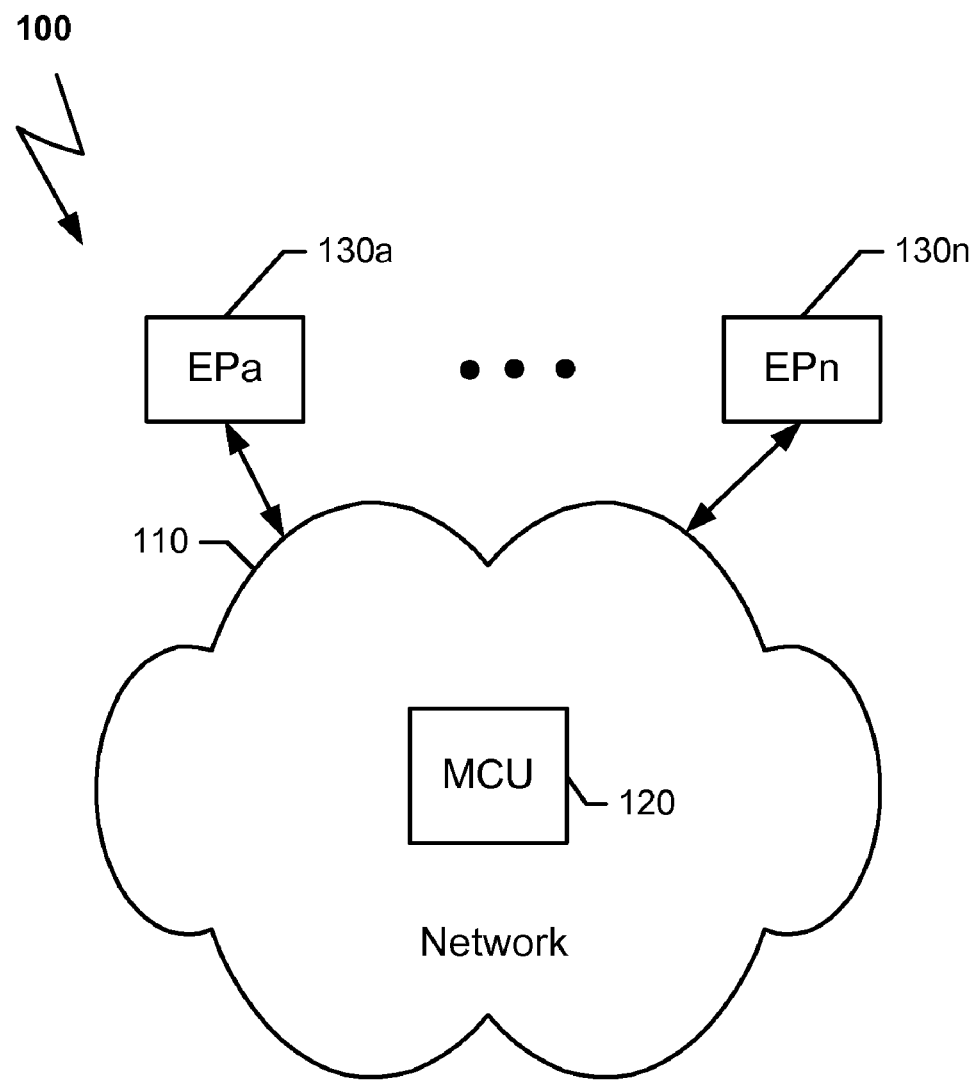
FIG. 1 illustrates a multimedia multipoint conferencing system.

FIG. 1 illustrates a block diagram of an exemplary multimedia multipoint conferencing system 100. System 100 can include a network 110, one or more multipoint control unit (MCU) 120 and a plurality of endpoint 130a-n. Network 110 can be a packet switched network, a circuit switched network or any combination of the two. The multimedia communication over the network can be based on communication protocol such as but not limited to H.320, H.324, H.323, SIP, etc.

MCU 120 and endpoints 130a-n can be adapted to operate according to embodiments of the present disclosure to improve the presentation of one or more cropped images in a CP image over the display of a multipoint video conferencing endpoint. In embodiments implementing a centralized architecture, MCU 120 can be adapted to perform cropping adjustment methods described herein. Alternatively, endpoint 130a-n as well as MCU 120 are adapted to perform cropping adjustment methods. More information about the operation of MCU 120 and endpoints 130a-n according to different embodiments are disclosed below in conjunction with FIGS. 2 to 6.

Figure 2:
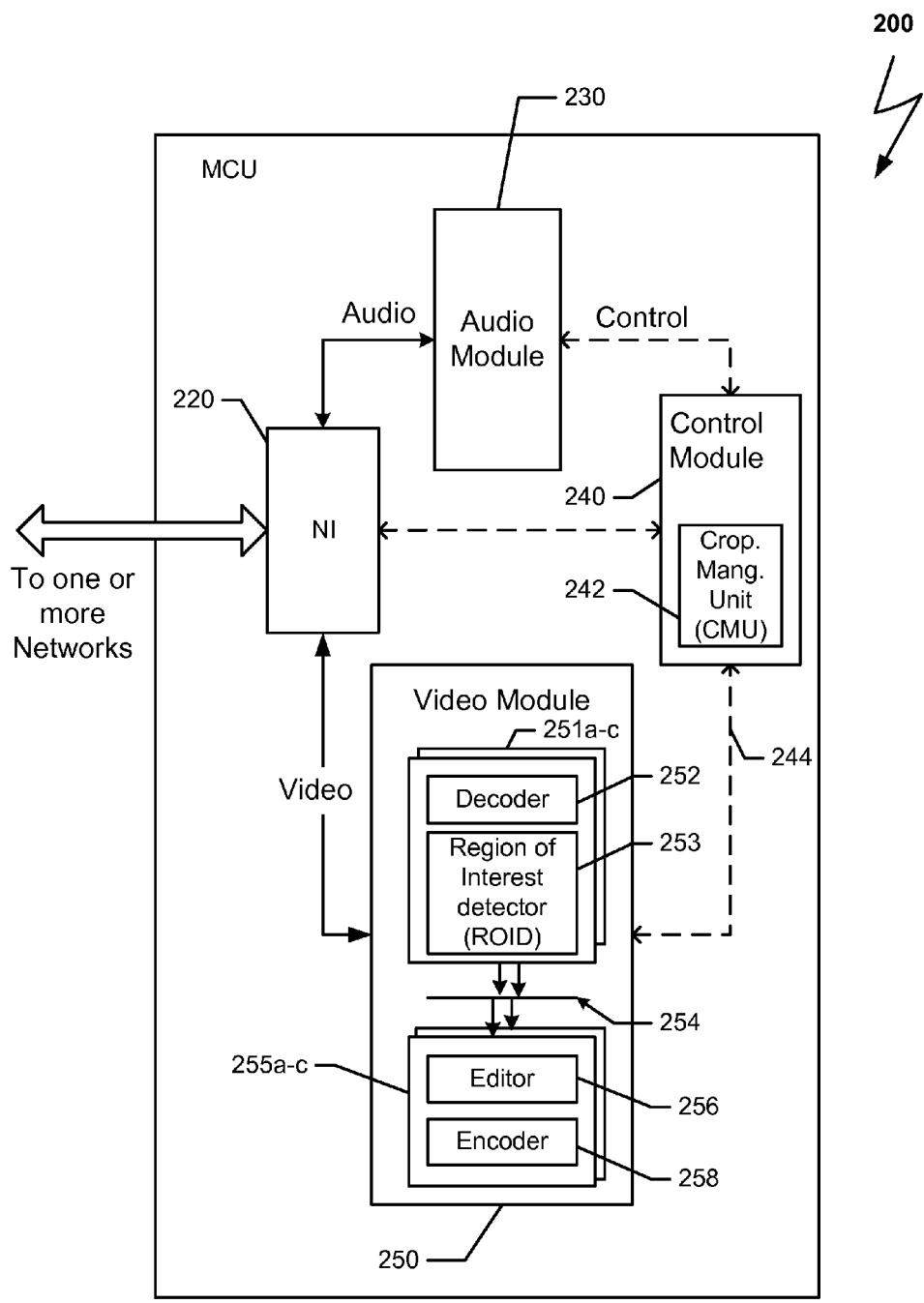
FIG. 2 is a simple block diagram of an exemplary MCU.

FIG. 2 illustrates relevant elements of an exemplary MCU 200, which is capable of implementing aspects of the disclosed cropping adjustment methods. MCU 200 may include a network interface module (NI) 220, an audio module 230, a control module 240 and a video module 250. The network interface module 220 receives communication from a plurality of endpoints 130a-n (FIG. 1) via networks 110 (FIG. 1). Network interface 220 processes the communication according to one or more variety of communication standards such as but not limited to H.320, H.323, SIP, etc. and compression standards such as H.261, H.263, H.264, G711, G722; MPEG etc. Network interface 220 can receive and transmit control and data information to/from other MCUs and endpoints. More information concerning the communication between the endpoint and the MCU over network 110 and information that describing signaling, control, compression, and setting a video call can be found in the international telecommunication union (ITU) standards H.320, H.321, H.323, H.261, H.263 and H.264.

Network interface module 220 multiplexes/de-multiplexes the different signals, media and/or "signaling and control", that are communicated between the endpoints and the MCU. The compressed audio signal is transferred to and from the audio module 230. The compressed video signal is transferred to and from video module 250 and the "control and signaling" is transferred to and from control module 240. Furthermore, if a distributed architecture is used, network interface module 220 can be capable of handling cropping adjustment related information that is transferred between the control module 240 and the endpoints 130a-n FIG. 1. In one exemplary embodiment in which the cropping adjustment information is sent as a part of a predefined header of the payload of an RTP packet, NI 220 can be adapted to process the predefine header to add cropping adjustment information to the RTP packet. The cropping adjustment information can include the size of the cropped image in pixels, for example.

Audio module 230 may receive, via network interface 220 and the audio line, compressed audio streams from the plurality of endpoint. The audio module 230 decodes the compressed audio streams, analyzes the decoded streams, selects certain streams and mixes the selected streams. Then the mixed stream is compressed and the compressed audio stream is sent via the audio line back to the network interface 220 which sends the compressed audio streams to the different endpoints. Audio streams that are sent to different endpoints can be different. For example the audio stream can be formatted according to the different communication standard and according to the needs of the individual endpoint. Audio stream may not include the voice of the user associated with the endpoint to which the audio stream is sent. However, the voice of this user can be included in all other audio streams. Audio module 230 can be adapted to analyze the received audio signals from the endpoints and determined the energy of each audio signal. Information on the signal energy can be transferred to the control module 240. The energy level can be used as a selection parameter for selecting appropriate one or more endpoints as the source of the mixing of the audio and/or the video of the conference. The endpoints can be referred as selected endpoints or presented endpoints.

Video module 250 receives compressed video streams from the plurality of endpoints 130a-n (FIG. 1), which are sent toward the MCU 200 via network 110 (FIG. 1) and processed by network interface 220. Video module 250 can create one or more compressed CP video images according to one or more layouts that are associated with one or more conferences currently being conducted by the MCU 200. An exemplary video module 250 can have a plurality of input modules 251a-c, a plurality of output modules 255a-c and a video common interface 254. Each input module 251a-c can be associated with an endpoint. Each output module 255a-c can be associated with one or more endpoints.

Control module 240 can be a logical unit that controls the operation of the MCU 200. In addition to common operation of a typical MCU, MCU 200 is capable of additional functionality as result of having control module 240. Control module 240 can include an exemplary cropping management unit (CMU) 242. In an exemplary embodiment in which automatic cropping adjustment methods are implemented, CMU 242 can be capable of instructing relevant input modules 251a-c to define coordinates of regions of interest (ROI) in their associated video image. A relevant input module 251a-c is the input module that is associated with the endpoint of a conferee whose image has to be cropped (a cropped endpoint). Based on the received information on the ROI, CMU 242 can define the cropped area keeping the ROI within the image. The coordinates of the defined cropped image can be transferred to the relevant output module 255a-c.

In an alternate exemplary embodiment in which semiautomatic method is implemented, an exemplary CMU 242 can be capable of providing an impression of the cropping decision (cropping impression) to one or more cropped endpoints. In one embodiment the size, in pixels for example, of the cropped area is sent to the endpoint with a request for the endpoint to present the self image of the conferee with an outline that matches the cropped size. Such communication with the endpoint can be out of band, over an Internet Protocol (IP) connection for example. In other embodiments the communication can be in band, for example as part of the predefined header of the payload of an RTP packet.

In an alternate exemplary embodiment, an output module 255a-c associated with a cropped endpoint can be instructed to create a cropped self image and to add it over the common CP image. The cropped self image can be created by collecting decoded video data delivered from an input module 251a-c associated with the cropped endpoint. Then the self video image is cropped to the required size and added to the CP as the cropping impression.

In parallel to the cropped impression, an exemplary CMU 242 can prompt the conferee of a cropped endpoint. Prompting the conferee can be done by instructing the audio module 230 to deliver an IVR message to the relevant cropped endpoint requesting the conferee to adjust his camera according to the cropped impression. Alternatively text data can be created and added to the CP video image by an output module 255a-c associated with the cropped endpoint. The text data can request the conferee to set the camera according to the cropping impression. According to some exemplary embodiments CMU can be part of the video module. More information on the operation of CMU 242 is discussed below in conjunction with FIGS. 3 and 4.

Referring now to elements of the video module 250 of the exemplary MCU 200. Exemplary input module 251a-c can include among other elements a decoder 252 and a region of interest detector (ROID) 253. The decoder 252 receives compressed video from an associated endpoint. An associated endpoint is an endpoint that is associated with the relevant input module 251. The decoder 252 decodes the compressed video into decoded video data. Usually the decoded video data is constructed from three components, YUV. One component reflects the brightness, the Y component and another two components U and V reflect the chrominance of the pixel, for example. The decoded information is stored in a decoder frame memory from which it is transferred toward one or more output modules 255a-c via common interface 254.

In some embodiments, the data of the decoder frame memory can be sampled by ROID 253. ROID 253 can be adapted to analyze the video image received from the associated endpoint to define the coordinates of one or more ROIs. One or more criteria can be used to define the ROI. The criteria can be based on the difference between appearances of a common conferee compared to elements of a common meeting room. One exemplary criterion can be flesh tone colors. Other criterion can be areas that change in time in a rate that match common movements of a conferee, etc. In other exemplary embodiments in which automatic definition of ROI is not used, such embodiment may not have a ROID 253. More information about the operation of ROID 253 is discussed below in conjunction with FIGS. 3, 5, and 6.

Among other elements, an exemplary output module 255a-c may include an editor 256 and an encoder 258. Editor 256 can be capable of getting decoded data of selected video images from the common interface 244 to be composed into a CP image created by the output module 255. The editor 256 may scale, crop, and place the video data of each conferee into an editor frame memory according to the location and the size of the image in the layout associated with the composed video of the CP image. Cropping can be done according to the instructions received from CMU 242. The cropping instruction takes into account the defined ROI.

In an embodiment wherein a semi-automatic method is used, editor 256 of an output module associated with a cropped endpoint can be adapted to add text data to the video data of a CP image. The text data can prompt the relevant conferee to set his camera in an appropriate position. Editor 256 of an output module associated with a cropped endpoint can be capable of creating a cropped self image according to the required crop size and placing the cropped self image in the CP image. A prompting message can be added requesting the conferee that uses the cropped endpoint to adjust his camera to an appropriate setting. When the editor frame memory is ready with all the selected conferee's images and with or without a self-cropped image, the data in the frame memory is ready to be encoded by encoder 258 and sent toward its associated endpoint.

Common functionality of various elements of video module 250 are known in the art and are not described in detail herein. Video modules are described in U.S. patent application Ser. No. 10/144,561; U.S. Pat. No. 6,300,973; and international application serial No. PCT/IL01/00757, the contents of which are incorporate herein by reference.

Figure 3:
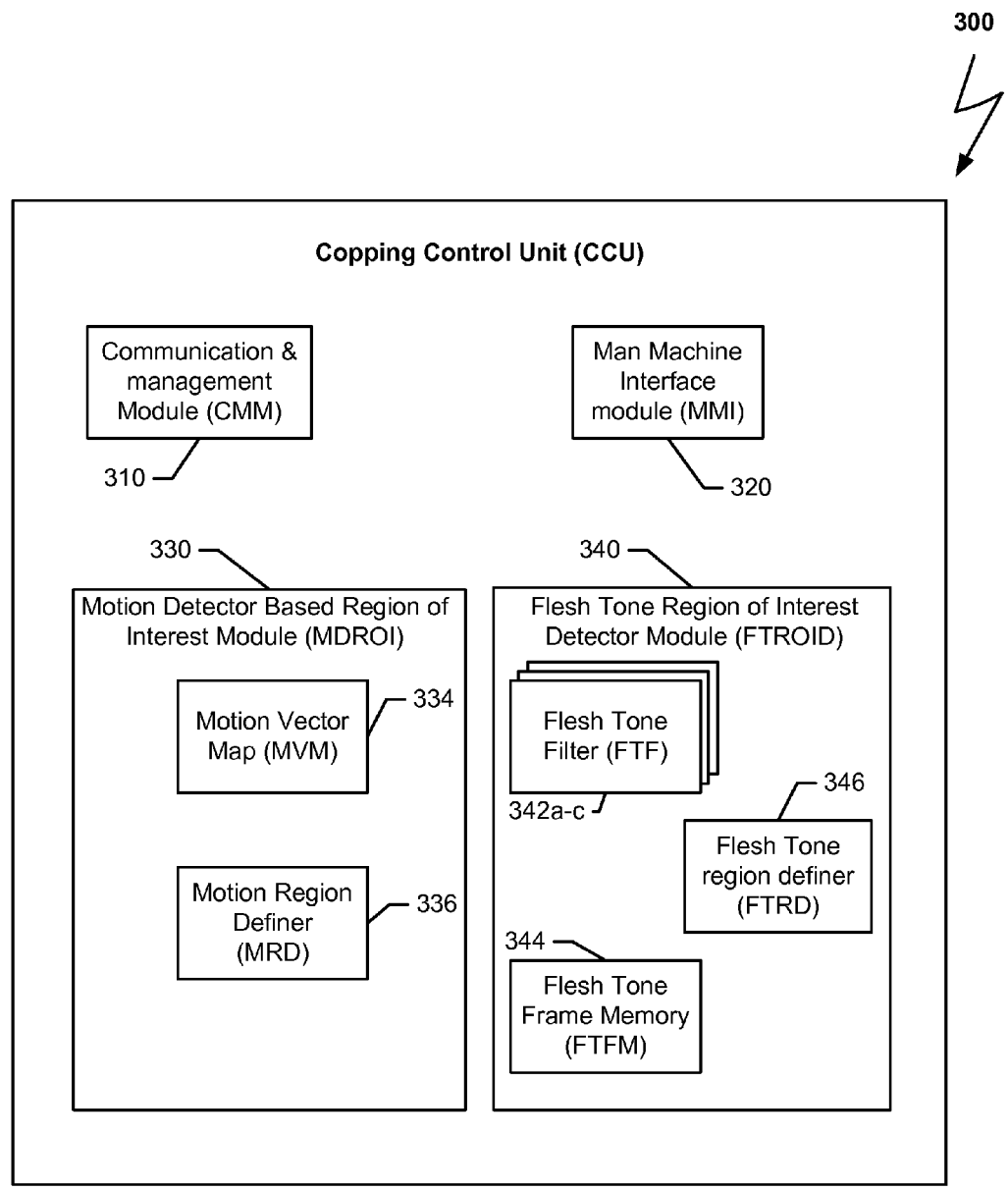
FIG. 3 is a simple block diagram of an exemplary cropping module.

FIG. 3 illustrates a block diagram with relevant element of an exemplary logical cropping control unit (CCU) 300. An exemplary CCU 300 can include a communication and management module (CMM) 310, a man machine interface (MMI) module 320, motion detector based region of interest module (MDROI) 330 and flesh tone region of interest detector (FTROID) 340.

A centralized CCU 300 can be used in an embodiment in which the cropping processed is handled by the video unit 250 (FIG. 2). In such an embodiment CCU 300 can be part of the video unit 250 (FIG. 2).

In other embodiments CCU 300 can be distributed between several modules of an MCU. The CMM 310 and the MMI module 320 can be included in the control module 240 (FIG. 2). The two ROI detectors (MDROI 330 and/or FTROID 340) can be included within a video input module 250. The MDROI 330 can sample a motion vector frame memory used by the decoder of the input module 251 (FIG. 2). The FTROID 340 can sample a ready decoded frame memory at the output of the decoder, for example.

Another exemplary embodiment of CCU 300 may not use all the modules illustrated in FIG. 3. For example, a CCU may have only one ROI detector, MDROI 330 or FTROID 340 or may have more than two ROI detectors. Alternatively, CCU may not utilize any ROI detectors and may allow the relevant conferee to set his camera to an appropriate position that matches the conferee's cropped image. In such embodiment, exemplary CCU may not have the two ROI detectors MDROI 330 and FTROID 340.

Yet in another exemplary embodiment CCU 300 can be embedded within an endpoint. In such an endpoint the one or more ROI detectors, MDROI 330 and/or FTROID 340, may be used to determine the ROI in a video image that is generated by the endpoint. The ROID can be associated with the encoder of the endpoint (not shown in the drawings), for example. The MDROI 330 can sample a motion vector frame memory used by the encoder of the endpoint. The FTROID 340 can sample the reference frame memory of the encoder, for example.

The indication on the ROI can be transferred to the MCU. The MCU may use the coordinates of the ROI to determine how to crop the image while keeping the ROI in the cropped image. In other exemplary embodiment the MMI 320 can be capable of prompting the conferee to set his camera to centralize the ROI. In alternate exemplary embodiments CMM 310 can be adapted to control the position of the camera automatically.

CMM 310 can be used to communicate with control module 240 in FIG. 2. In the downlink direction CMM 310 may receive a command from control module 240 to start sampling and analyzing a current video frame to define the ROI. In the uplink direction, i.e. toward control module 240, CMM 310 can send a set of coordinates of one or more ROIs. The coordinates are the results of the detection made by the associated MDROI 330 and/or FTROID 340.

Communication between CMM 310 and control module 240 (FIG. 2) depends on the architecture used. For example, in the case that CCU 300 is embedded within a video unit 250 (FIG. 2) of MCU 200 (FIG. 2), the communication between CMM 310 and control module 240 can be implemented over the control bus 244 connecting the control module 240 with a video module 250. Alternatively in an embodiment in which CCU 300 is located at the endpoint 130a-c while control module 240 is located at the MCU 120 (FIG. 1) the communication can be implemented out of band or in band. Out of band communication can be handled via a connection between the endpoint and the MCU over an Internet Protocol (IP) network, for example.

ROI information can be communicated between an endpoint and an MCU in several ways. In sessions in which the compression standard is H.263 one or more pictures supplement enhanced information (PSUPP) fields in the frame header can be modified to carry the sampling command in the downlink direction and the coordinates of the ROI in the uplink direction toward the MCU. In such an embodiment the decoder of the endpoint can be adapted to parse the ROI commands from the compressed video data received from the MCU. The parsed ROI commands can be transferred to CMM 310. In the other direction, the CMM 310 can transfer the ROI coordinates to the encoder of the endpoint. The encoder of the endpoint can be adapted to embed the ROI coordinates in the PSUPP fields.

If multimedia communication is over a packet switched network, the communication between CMM 310 and control module 240 can be implemented using a predefined header of the payload of a Real-time Transport Protocol (RTP) video packet. In such an embodiment the coordinates of the ROI as well as the sampling command can be embedded within the predefined header of the payload of the RTP video packet.

If communication between CCU 300 and control module 240 is via predefined headers, the network interface 220 (FIG. 2) can be adapted to parse the received information and retrieve the coordinates of the ROI received from CMM 310 and deliver the coordinates of the ROI to control module 240 over the control bus that connects the control module 240 and network interface 220. In the other direction the network interface 220 is adapted to receive sampling command and add it or MUX the information into predefined RTP payload header for example.

MMI 320 can communicate with a conferee whose image is to be cropped. In one exemplary embodiment MMI 320 can generate a banner (text, with or without IVR) prompting the conferee to adjust his camera to centralize the ROI. In an alternate embodiment, in which the user is not involved in the process, MMI 320 is not needed.

An exemplary MDROI 330 can include a motion vector map (MVM) 334 and a motion region definer (MRD) 336. Some exemplary embodiments (not shown in the drawings) may include one or more filters such as band-pass filters, low-pass filters or notch filters to remove interference motions such as clocks, fans, monitors, etc.

An exemplary MVM 334 can be a memory structure that represents a motion vector image frame. Each address in the MVM 334 is associated with a motion unit. A motion unit is a group of pixels for which two motion vectors are calculated by a decoder of an MCU or an encoder of an endpoint. For example, if the compression standard is H.264 a motion unit can be a group of 4×4 pixels up to 16×16 pixels. For H.263 without annexes the motion unit can be 16×16 pixels. The data of each address in MVM 334 can reflect the number of frames in which a motion unit associated with the relevant address of MVM 334 has a motion vector other than zero. At the end of a sampling period the content of an address of MVM 334 will reflect the number of video frames that the motion unit associated with a relevant address had motion vectors other than zero. In some embodiments only motion units having a motion vector greater than a certain threshold are counted. The threshold can be configurable. If the data of an address in MVM 334 is zero then the relevant motion unit associated with that address did not have a motion vector during the entire sampling period.

An exemplary MRD 336 can be used to manage the operation of MDROI 330. MRD 336 can be initiated upon receiving a command to determine the coordinates of one or more ROIs. MRD 336 can be adapted to allocate a MVM 334 that will be used during a sampling period to read the motion vectors of each motion unit from the MVM associated with the decoder/encoder. Based on the value of the retrieved motion vectors, the content of appropriate address in MVM 334 can be updated. If the retrieved value for both motion vectors are bigger than a certain threshold the content can be incremented by one. Otherwise the content may remain without change. After updating the content of the relevant address in MVM 334, MRD 336 may repeat the process for the next motion unit in the motion vector frame memory. The process may continue over the entire MVM. Then MRD 336 may wait for the next motion vector map and repeat the process for the new MVM.

At the end of the sampling period, MRD 336 may analyze the content of MVM 334 to define the coordinates of one or more ROIs, if they exist. An exemplary MRD 336 may use one or more criteria to define the ROIs. For example, an exemplary MRD 336 may ignore all the motion units wherein the content of their address in MVM 334 is below a certain threshold of instances. An exemplary threshold can be a few tens of percentages of the number of frames sampled during the sampling period (10 to 30%, for example). Then the MRD 336 may check the size of the area of regions that have higher number of instances. Areas having size above a certain percentages of the number of motion units in the MVM 336, for example above 25%×25% of motion units, can be defined as ROI. Another embodiment may adapt the size of the ROI to the required cropping size.

After analyzing the content of MVM 334, MRD 336 may determine whether ROI can be defined. If the answer is yes the coordinates of the ROI are transferred to the control module 240 (FIG. 2) via CMM 310. Otherwise, an indication that a ROI can not be defined by MDROI 330 is sent toward the control module 240. After sending its decisions the resources of MDROI 330 may be released until another detecting command is received.

Some exemplary embodiments in which filters are used by MDROI 330, an exemplary MRD 334 may compare the coordinates of the defined ROIs with coordinates of interference areas that were defined by one or more of the filters. If a ROI fails within an interference area a decision can be made to ignore the defined ROI. More information about the operation of MDROI 330 is discussed below in conjunction with FIGS. 4 and 6.

An exemplary FTROID 340 can include one or more flesh tone filters (FTF) 342a-c, a flesh tone frame memory (FTFM) 344 and a flesh tone region definer (FTRD) 346. A FTF 342a-c can be a look up table (LUT) in which the address can have three fields wherein each field is associated with a value of a video data component of a pixel (Y, U, or V). For example, the eight most significant bits (MSBs) field of the address can be assigned to the Y component. The next field of eight bits can be associated with the U component and the last field of the eight less significant bits (LSBS) of the address can be assigned to the value of the V component of a pixel. The data of each address can be a race code, i.e. a number associated to a color space (YUV) common among people belonging to particular race. Each FTF 342*a-c* can be associated with a color space that is relevant to a certain race, for example.

Exemplary FTFM 344 can represent a video frame. Each address in the FTFM 344 is associated with a location of a pixel in a decoded video image. The data of each address can be divided into race code fields. Each race code field is associated with a race code that is filtered by FTF 342*a-c*. The data of each field can reflect the number of frames in which a pixel associated with the relevant address of FTFM 344 has a color that belongs to the color space that is associated to the race code that has been assigned to the field. At the end of a sampling period the content of an address of FTFM 344 will reflect the number of video frames that the pixel which is associated with the address had a color that reflects a race that is associated to the relevant field. If the data of an address in FTFM 344 is zero, it means that the certain pixel, which is associated with that address, did not have any color that belongs to one of the color spaces that are associated to a flesh tone of a human race.

Exemplary FTRD 346 can be used to manage the operation of FTROID 340. FTRD 346 can be initiated upon receiving a command to determine the coordinates of one or more ROIs. FTRD 346 can be adapted to allocate a FTFM 344 that will be used during the sampling period and to read the YUV components of each pixel from a new ready decoded frame memory. Based on the YUV components of the pixel, FTRD 346 may retrieve one or more race codes from FTF 342*a-c*. Some of the YUV values may appear in more than one race's color space. Then the appropriate one or more race code fields of the content of the address in FTFM 344 assigned to the pixel can be incremented by one. After updating the content of the relevant address in FTFM 344, FTRD 346 may repeat the process for the next pixel in the decoded frame memory. The process may continue over the entire decoded frame memory. Then FTRD 346 may wait for the next ready decoded frame memory and repeat the process for the new ready decoded frame memory.

At the end of the sampling period FTRD 346 may analyze the content of FTFM 344 to define the coordinates of one or more ROIs, if they exist. An exemplary FTRD 346 may use one or more criteria to define the ROIs. For example an exemplary FTRD 346 may ignore all the pixels wherein the content of each of the race code fields is below a certain threshold of instances. An exemplary threshold can be a few tens of percentages of the number of frames that were sampled during the sampling period (10 to 30%, for example). Then the FTRD 346 may check the size of the regions that have higher instances. Areas having a size greater than a certain number of numbers of pixels, for example greater than 32×32 pixels, can be defined as ROI. After analyzing the content of FTFM 344, FTRD 346 may determine whether ROI can be defined. If the answer is yes the coordinates of the ROI are transferred to the control module 240 (FIG. 2) via CMM 310. Otherwise, an indication that a ROI can not be defined by FTDOID 340 is sent toward the control module 240. After sending its decisions the resources of FTDOID 340 can be released. The control module 240 (FIG. 2) may determine whether to repeat the process for a longer sampling period. Other embodiments may adapt the size of the ROI to the required cropping size. More information about the operation of FTROID 340 is discussed below in conjunction with FIGS. 4 and 5.

An exemplary embodiment can have two or more types of ROI detectors and a final decision on the coordinates of the ROI can be based on integrating the decisions of both detectors.

In yet an alternative embodiment the coordinates of the defined ROI can be used to improve the video image. For example the FECC can be used to increase/decrease the zoom setting of the camera to increase a small ROI.

Figure 4:
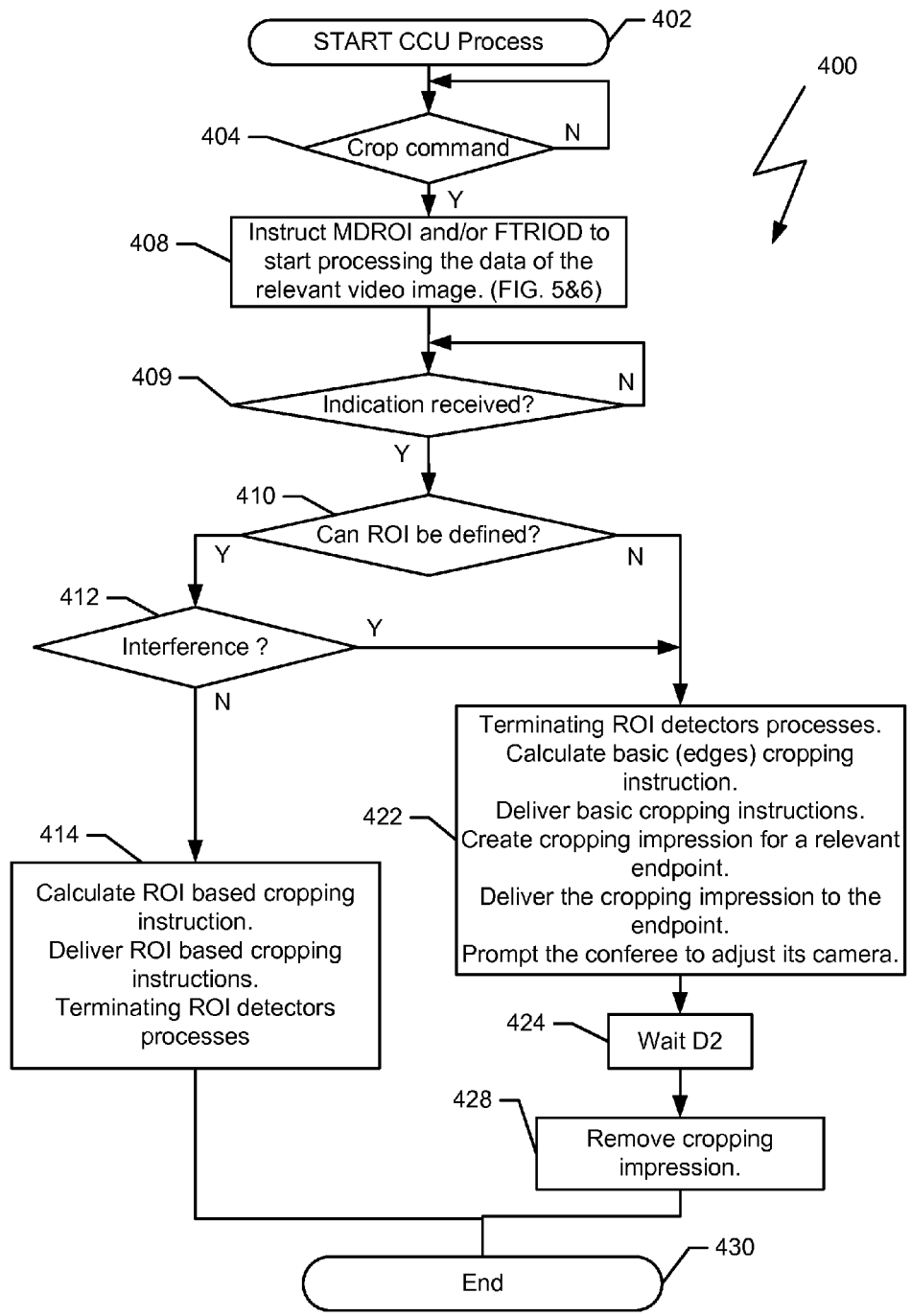
FIG. 4 is a flowchart illustrating a method for adjusting a conferee image within a cropped area.

FIG. 4 illustrates an exemplary process 400 with relevant steps that can be implemented by an exemplary CCU 300 (FIG. 3). Method 400 can be used for defining regions of interests in a video image. Exemplary process 400 describes two methods-an automatic method and a semiautomatic method. Both methods can be implemented during the same adjusting period. In some embodiments the automatic method can be used, in other embodiments the semiautomatic method can be used.

Process 400 can be initiated 402 during establishing a videoconference session. After initiation method 400 may wait 404 to get a crop command related to one of the input modules 251 (FIG. 2). Upon receiving a crop command an instruction can be sent 408 to one or both of the ROI detectors 330 & 340 (FIG. 3), according to the numbers of ROI detectors that are used by the relevant CCU 300. In an embodiment having both detectors, a flesh tone region of interest detector FTROID 340 and a motion detector based region of interest module MDROI 330 the command is sent to both detectors.

After initiating 408 the ROI detectors, method 400 may wait 409 for receiving an indication from at least one of the ROI detectors. Then a decision is made 410 whether a one or more ROI can be defined. The operation of MDRIO 330 and FTROID 340 is discussed below in conjunction with FIGS. 5 and 6. If a region of interest can not be defined method 400 may proceed to step 422 and terminate the ROI detector process and may initiate the semiautomatic process 422.

During the semi automatic process 422, basic cropping instruction can be calculated and delivered to the control mode. The basic cropping instructions may be to crop one or more edges of the image. After delivering the cropping instruction, a cropping impression can be sent to the relevant endpoint. Different types of cropping impressions can be implemented. In one exemplary embodiment the cropping impression can be a cropped video image of the conferee having his image cropped. The cropped image can be added to the composite video image that is sent to the endpoint of the cropped conferee. A message can be sent to the conferee's endpoint to prompt the conferee to adjust his camera to match the center of the cropped image. Prompting the conferee can be done by an audio message sent with a mixed audio to the cropped endpoint. Another embodiment may compose a text banner with the CP image that is sent to the user.

After sending the cropping impression and prompting message, method 400 may wait 424 for few seconds to few minutes (D2) to enable the user to set his camera to the appropriate location. After period D2 method 400 may proceed to step 428 and remove the cropping impression from the video sent to the cropped endpoint.

Another embodiment may calculate the required size of the cropped image and may send the cropping dimension to the endpoint requesting the endpoint to create a PIP image in the proportion of the cropped image. The created PIP image is presented to the conferee. Other type of cropping impression can be done by delivering information for creating an outline, in the size of the cropping image, to the endpoint. The endpoint builds the outline above the PIP image and prompts the user to set its video camera accordingly. After removing the cropping impression at step 428 method 400 may be terminated at step 430.

Returning now to step 410 if a decision about ROI is made, then the defined ROI can be compared to the regions defined as interference regions by one of the filters and a decision is made 412 whether the coordinate of the ROI has a conflict with an area of the interferences. If there is a conflict, then method 400 may proceed to step 422 which is discussed above. If there is no conflict with one of the filters, then method 400 may proceed to process 414 and may calculate cropping instructions based on the coordinate of the defined regions of interest, keeping the regions of interest inside the cropped image. An alternate embodiment may not have interference filters and may skip step 412.

Defining the cropping instruction 414 may include cropping two or more edges asymmetrically to reduce the size of the image to the required size while keeping the region of interest inside the cropped image. The cropping instructions can be delivered to CMU 242 at the MCU 200 (FIG. 2); a termination instruction can be sent to one or both of the ROI detectors 330 and 340; and method 400 can be terminated 430.

An impression of the automatic cropping image can be delivered 414 to the relevant conferee's endpoint to let the conferee override the automatic decision. Handling the cropping impression can be similar to the examples discussed above in conjunction with steps 422, 424 and 428.

In some exemplary embodiments in which an automatic decision is not used, a cropping impression can be sent to the user associated with a prompting message. The user can be requested to adjust the camera according to the cropping impression to set the region of interest in the center of the cropped image. In such embodiment method 400 may include processes, 402, 404, part of 422, 424, 428 and 430. In other exemplary embodiments using only an automatic decision method 400 may not include the branch with the steps 422, 424 and 428.

According to some exemplary embodiments process 400 can be initiated from time to time during the conference, every few minutes for example, to check whether the regions of interest are still in the center of the cropped area. If not, updated cropping instructions can be delivered to the MCU. In some exemplary embodiments process 400 may instruct the camera automatically by using the far end camera control (FECC) signals. The camera can be set to the appropriate location to keep the region of interest in the cropped image. Alternatively or additionally the zoom can be adjusted.

Figure 5:
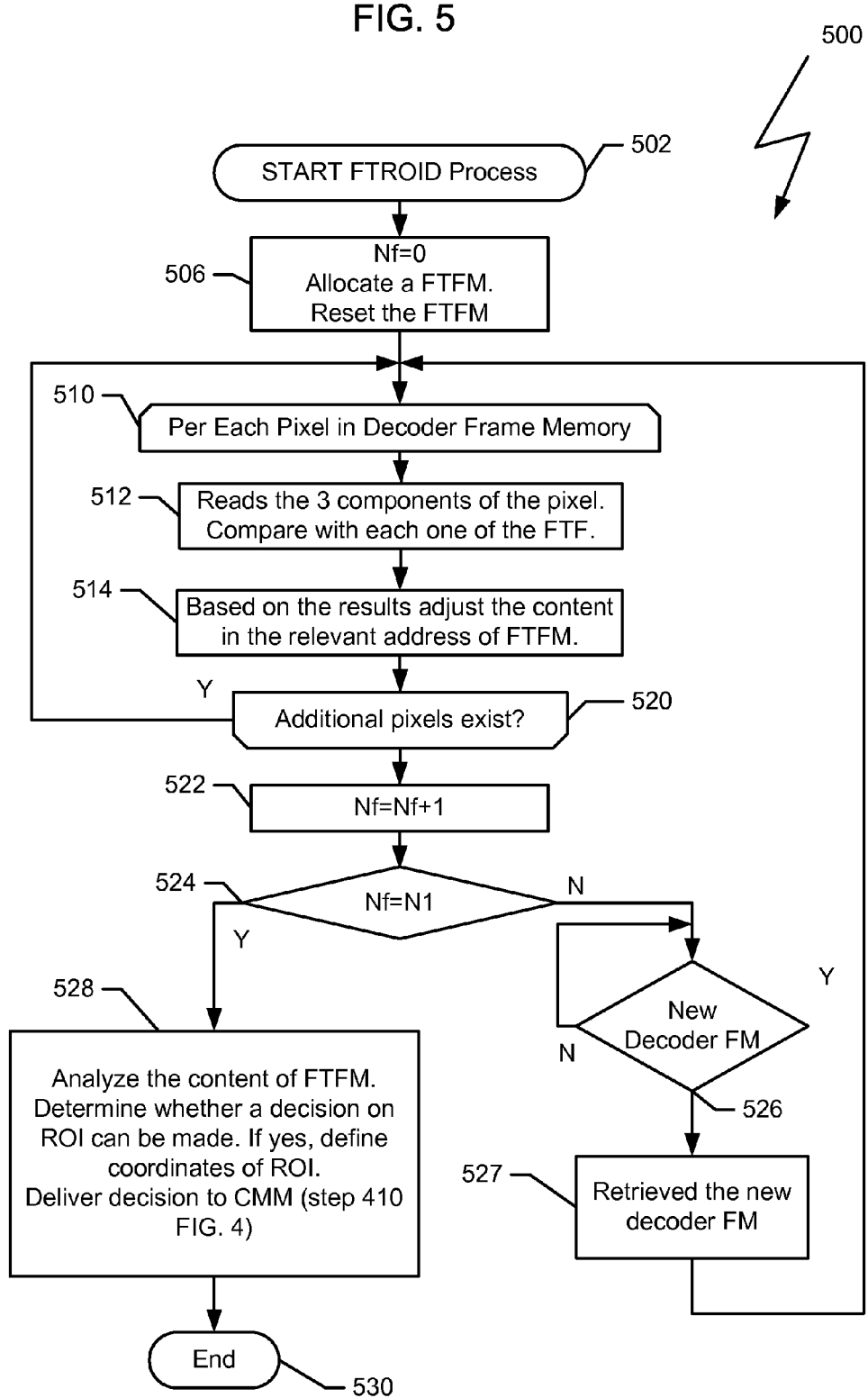
FIG. 5 is a flowchart illustrating an alternative process for defining region of interest.

FIG. 5 illustrates relevant steps of an exemplary process 500 for defining coordinates of one or more regions of interest based on flesh tone colors. Method 500 can be implemented by an exemplary flesh tone region of interest detector module 340 (FIG. 3). Exemplary method 500 can be initiated 502 at step 408 of process 400 (FIG.4). After initiation frame counter Nf is reset, counter Nf counts the number of video frames that are sampled during the processing time of method 500. A flesh tone frame memory FTFM 344 (FIG. 3) can be allocated and initiated whereby a zero value is written in the addresses of the flesh tone frame memory.

After initiating the FTFM, an internal loop from step 510 to step 520 and an external loop from step 510 to step 526 can be initiated. The internal loop from step 510 to 520 is used to compare the video data of each pixel in the decoder frame memory to one or more of the flesh tone filters 342a-c (FIG. 3). The external loop, steps 510 to step 526, is used to repeat the measuring for each video frame during the sampling period.

Returning now to step 510 a loop is started for each pixel in the decoder frame memory. Per each pixel in the decoder frame memory the three components of the video data of the pixel are retrieved compared to each one of the flesh tone filters 342 (FIG. 3). The value of the three components are used as an address for each one of the flesh tone filters and the data stored in the flesh tone filter is read. The data can be zero for the video components that do not represent a flesh tone. Otherwise, the data may have a race code indicating that the three components of the video data belong to a color space that is associated with the race associated with the race code.

After comparing the three components of the video data of the pixel to each of the FTF 342, content of the appropriate address of FTFM 344 (FIG. 3) is retrieved 514 and updated according to the result of step 512. Each race field associated with the address is updated. The counter of the appropriate race code is incremented and the updated data is stored in the same address in FTFM 344 (FIG. 3). After updating the content, a decision is made 520 whether there are additional pixels in the decoder frame memory. If yes method 500 returns to step 510 and may repeat the process.

If 520 there are no additional pixels in the frame memory, the counter Nf is incremented by one 522 and a decision is made 524 whether Nf is equal to N1. N1 can be a configurable threshold that defines the number of frames that will be processed during the current sampling period. If 524 Nf does not equal to N1 then method 500 may wait 526 for a new decoder frame memory. The new decoder frame memory is retrieved 527 and method 500 may return to step 510 and start processing the data stored in the new decoder frame memory. If 524 counter Nf is equal to N1 then method 500 may proceed to step 528.

At step 528 the content of the frame flesh tone memory is retrieved and a decision is made whether the value of the counter of each field (race code) is above the instance threshold value. If the number of instances of a certain race code is above the instance threshold, then it can be assumed that this pixel belongs to color space reflecting human flesh. Then the size criteria can be implemented on such areas. If the size is above the size threshold it can be assumed that the area can be occupied by an image of a person and therefore is a ROI. The coordinate of the one or more regions of interest can be delivered to CMM 310 (FIG. 3) as illustrated in step 410 (FIG. 4). After transferring the decision method 530 can be terminated.

Figure 6:
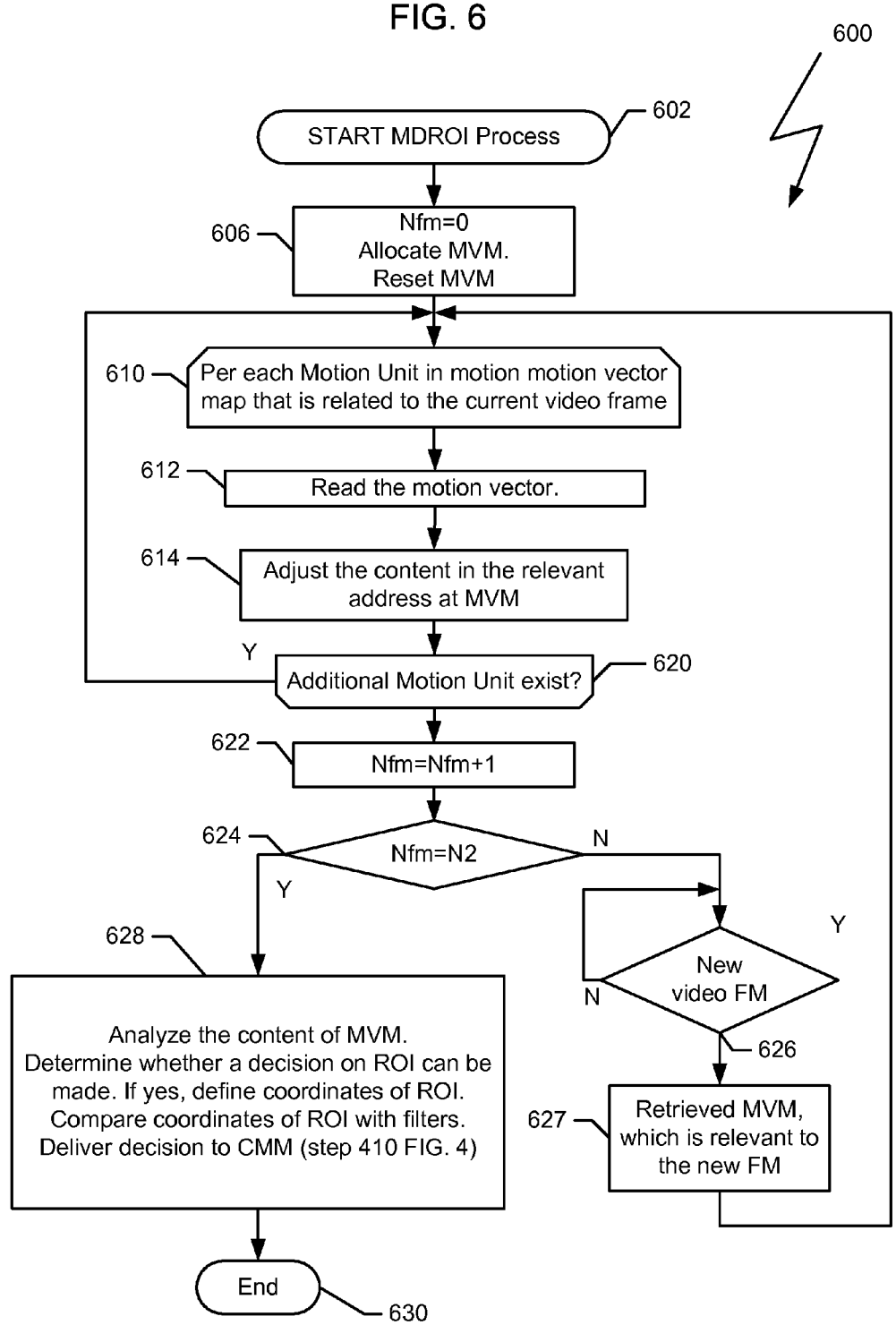
FIG. 6 is a flowchart illustrating another process for defining region of interest.

FIG. 6 illustrates relevant steps of an exemplary method 600 to define regions of interest based on motion vectors. Method 600 may be implemented by an exemplary motion detector region of interest module 330 (FIG. 3). Method 600 can be initiated 602 during step 408 (FIG. 4) by an exemplary cropping control unit 300 (FIG. 3). After initiation a frame counter Nfm is reset. Frame counter Nfm counts the number of video frames sampled during the current sampling period. Then a motion vector mapping (MVM) memory structure is allocated and a zero value is written as the data of each address of MVM. The address of MVM is relevant to a motion unit as explained above. A motion unit is a group of pixels for which a motion vector is calculated. The content of each address in MVM is a counter that counts the number of frames in which a motion vector above a certain threshold was found during the sampling period.

After resetting the MVM, method 600 may start two loops: an internal loop from 610-620 and an external loop from 610-627. During the internal loop each motion unit in the motion vector map of the video frame is checked and compared to a motion vector threshold. The external loop repeats the process for each video frame during the sampling period.

At step 610 per each motion unit in the motion vector map the motion vector stored in the motion vector map related to the current video frame in the address representing the current motion unit is retrieved 612 and compared to the motion vector threshold. If the motion vector is greater than the threshold the data stored in the relevant address of the motion MVM is retrieved and incremented 614 by one and the new value is stored instead of the old one. If the motion vector of the current motion unit is not greater than the threshold, the data is not incremented and remains unchanged.

A decision is made 620 whether there are additional motion units in the motion vector map related to the current video frame. If there are additional motion units, then method 600 returns to step 610 and starts another cycle of the loop for the current motion unit. If 620 there are no additional motion units, method 600 may increment the counter Nfm by one 622 and a decision is made whether Nfm is equal to N2. N2 can be a configurable parameter that reflects the number of frames to be sampled to determine the ROI. The value of N2 can be in the range of a few tens to a few hundreds of frames. If Nfm is not equal to N2 then method 600 may wait 626 to a new video frame memory. Upon receiving an indication 626 that a new decoder frame is ready, the new motion vector map related to the new video frame is retrieved 627 and method 600 may return to step 610 and start processing the motion units related to the new frame memory.

Returning now to step 624 if Nfm is equal to N2 which means that the sampling period can be terminated, method 600 proceed and starts process 628 for analyzing the results. The content of MVM is analyzed to determine the coordinates of a region of interest based on motion vector. Different criteria can be used to define the validity and the coordinates of the region of interest. One criterion is the number of instances that a motion vector of a certain motion unit is greater than a threshold value. The value of the data stored in the address of the current motion unit in MVM reflects the number of instances the motion vector of the relevant motion unit was greater then the threshold. If the value is above the instance threshold level, then it can be assumed that this motion unit belongs to an object that moves and therefore is a region of interest. Then a surrounding area of this motion unit is checked to be above the instance threshold if also the motion units in the surrounding area are above the instance threshold, then the surrounding area can be defined as an area of interest. The size of the surrounding area can be a few tens of percentages of the number of the motion units.

After defining the coordinates of one or more regions of interest, process 628 may continue and compare the coordinates of the region of interest with the result of one or more of the interference filters, to check if there is a conflict between the filters and the decision of the region of interest. If there is such a conflict, then the region of interest may belong to a moving object but not a relevant moving object. For example, it may be a clock or a fan etc. The decision of the method 600 can be transferred to CMM 310 (FIG. 3) as discussed at step 410 in FIG. 4 and method 600 can be terminated 630.

In the present disclosure, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware.

In the description and claims of the present disclosure, "comprise," "include," "have," and conjugates thereof are used to indicate that the object or objects of the verb are not necessarily a complete listing of members, components, elements, or parts of the subject or subjects of the verb.

It will be appreciated that the above described apparatus, systems and methods may be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure can be implemented by combination of features and elements that have been described in association to different exemplary embodiments along the discloser. The scope of the invention is limited only by the following claims and equivalents thereof.

What is claimed is:

1. A method of formatting a video image associated with an endpoint for display in a videoconference, the method comprising:
determining a region of interest within the video image by analyzing one or more motion parameters and one or more color parameters within the video image; and
cropping the video image to match an associated segment in a conferencing image, wherein the cropping preserves the region of interest.

2. The method of claim 1, wherein preserving the region of interest comprises adjusting a camera at the endpoint to keep the region of interest within the cropped image.

3. The method of claim 2, wherein adjusting the camera comprises presenting an impression of a cropped image to the endpoint and prompting a user at the endpoint to adjust the camera so that the region of interest remains within the cropped image.

4. The method of claim 2, wherein adjusting the camera comprises remotely adjusting the camera from an MCU.

5. The method of claim 1, wherein determining a region of interest comprises presenting an impression of a cropped image to the endpoint and allowing a user at the endpoint to determine the region of interest.

6. The method of claim 1, wherein analyzing one or more motion parameters within the video image comprises sampling an encoder's motion vector frame memory.

7. The method of claim 1 wherein analyzing one or more color parameters of the video image comprises sampling an encoder's reference frame memory.

8. The method of claim 7, wherein analyzing one or more color parameters comprises determining if the color parameter corresponds to a flesh tone.

9. The method of claim 1 wherein cropping the video image comprises transmitting coordinates of the region of interest to a multipoint control unit.

10. The method of claim 1 wherein cropping the video image is performed within an encoder of an endpoint.

11. An apparatus for conducting a videoconference, comprising:
one or more region of interest detector modules configured to determine a region of interest within a video image wherein the one or more region of interest detector modules comprise at least one motion detector and at least one flesh tone detector; and a cropping manager module configured to define cropping instructions for video image to create a cropped image wherein the determined region of interest is within the cropped image.

12. The apparatus of claim 11, further comprising a module adapted to deliver an impression of the cropped image to an endpoint.

13. The apparatus of claim 12, wherein the apparatus is adapted to prompt a user at the endpoint to adjust a camera at the endpoint according to the impression of the cropped image.

14. The apparatus of claim 11 wherein the cropping manager module is configured to pass the cropping instructions to a video encoder within the apparatus.

15. The apparatus of claim 11 wherein the cropping manager module is configured to pass the cropping instructions to a multipoint control unit.

16. An apparatus for conducting a videoconference, comprising:
one or more input modules adapted to receive and decode compressed video images transmitted by a video stream;
one or more region of interest detector modules configured to determine a region of interest within a decoded a video image, wherein the one or more region of interest detector modules comprise at least one motion detector and at least one flesh tone detector;
a cropping manager module configured to define cropping instructions for the decoded video image to create a cropped image wherein the determined region of interest is within the cropped image; and
one or more output modules is adapted to generate a continuous presence video image from one or more of the decoded video images streams wherein the continuous presence video image comprises the cropped image.

17. The apparatus of claim 16, wherein the output module is adapted to send a cropped self image to an endpoint.

18. The apparatus of claim 17, wherein the output module is adapted to prompt a user at the endpoint to adjust a camera at the endpoint according to the cropped self image.

19. The apparatus of claim 16, further comprising a far end camera control module adapted to adjust a camera at an endpoint so that the region of interest is within the cropped image.

* * * * *